May 5, 1936.    R. S. SHAHU    2,039,939
COMBINED LUGGAGE CARRIER AND SEAT
Filed Feb. 26, 1934    3 Sheets-Sheet 1
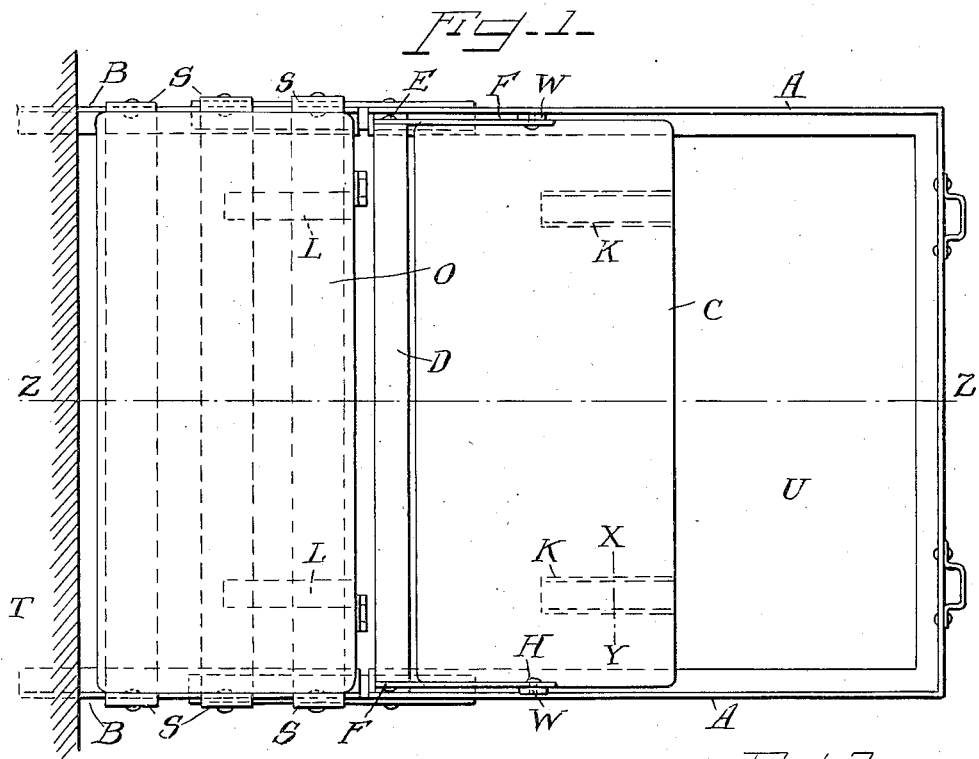
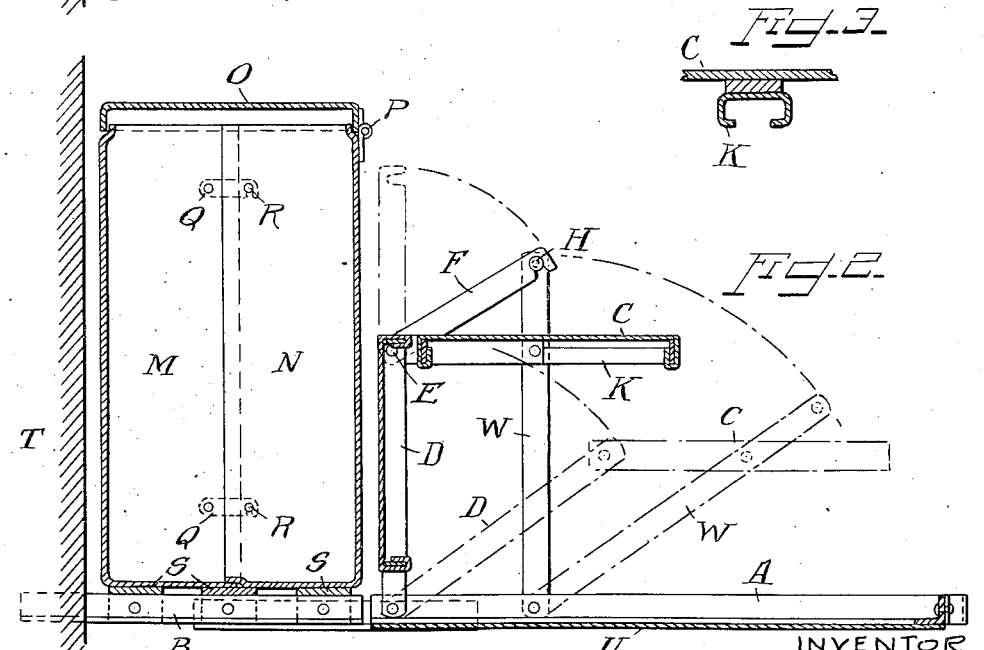
INVENTOR
Ram Swarup Shahu
BY
his ATTORNEY.

May 5, 1936. R. S. SHAHU 2,039,939
COMBINED LUGGAGE CARRIER AND SEAT
Filed Feb. 26, 1934 3 Sheets-Sheet 2
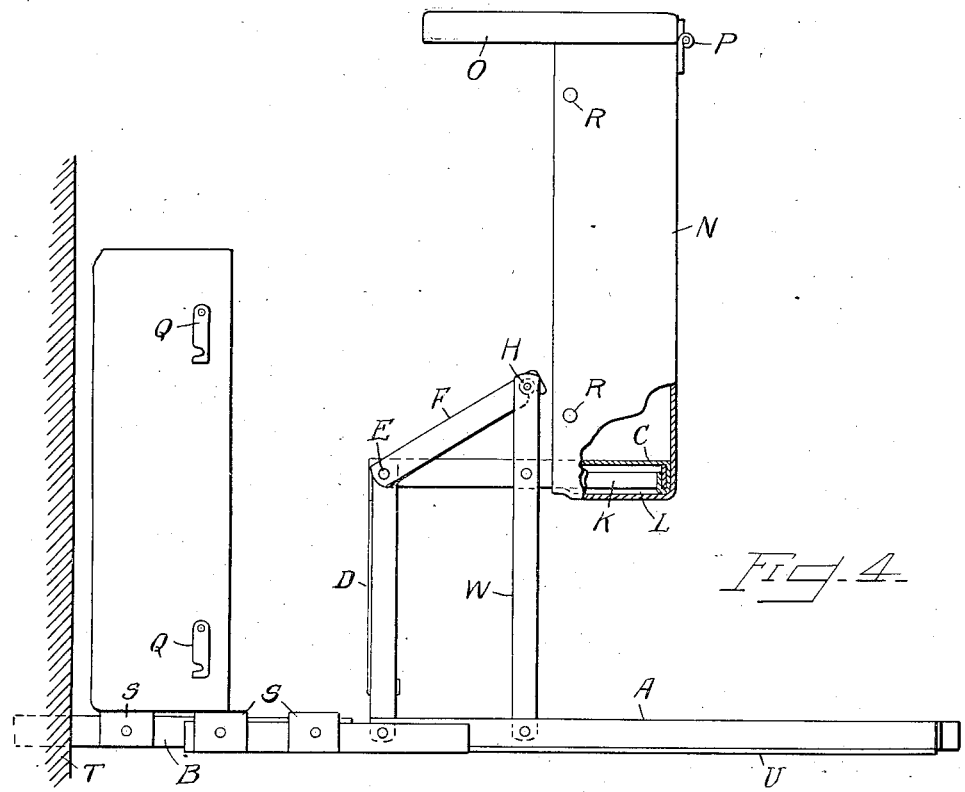
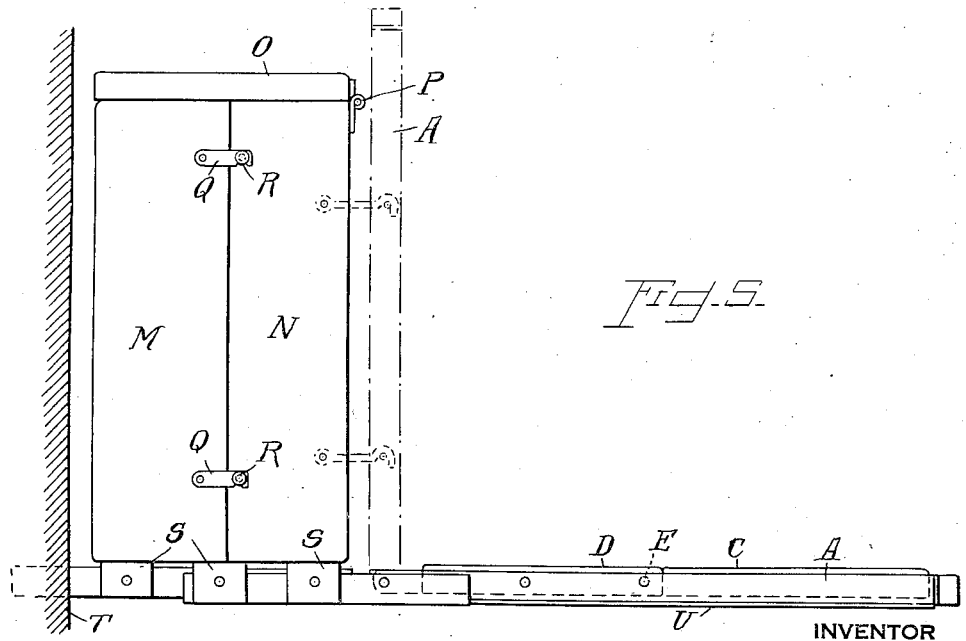
INVENTOR
Ram Swarup Shahu
BY
his ATTORNEY May 5, 1936.    R. S. SHAHU    2,039,939
COMBINED LUGGAGE CARRIER AND SEAT
Filed Feb. 26, 1934    3 Sheets-Sheet 3

INVENTOR
Ram Swarup Shahu
BY
his ATTORNEY.

Patented May 5, 1936

2,039,939

UNITED STATES PATENT OFFICE 2,039,939

COMBINED LUGGAGE CARRIER AND SEAT

Ram Swarup Shahu, Fatehgarh, British India

Application February 26, 1934, Serial No. 712,944
In British India May 25, 1933

1 Claim. (Cl. 224—29)

This invention relates, as hereinafter described, to a combined unit in which arrangement for a luggage carrier, a seat and if necessary a box also is provided, the said combined unit being adapted for attachment to motors cars or the like vehicles.

In accordance with the present invention a combined unit is provided for attachment to the back of a car body comprising a seat and a luggage carrier and if necessary a box, suitably supported upon a frame or frames, adapted to be adjusted to serve either as a box alone or as a seat, a box and a luggage carrier, or as a seat and a luggage carrier, or as a box and a luggage carrier.

The device according to one construction to be hereinafter fully explained by the help of accompanying drawings and embodying the principle of my invention, comprises two horizontal frames on which a box, a luggage carrier and a seat are provided, one of the said frames hereinafter called the first frame fixed to the back of the car body, and supporting the second frame therefrom by hinges, metallic sheet, bars or wooden pieces being fitted in both the frames, while a portion of a box with its upper lid completely removed is supported and fixed on the frame nearest the car body, the remaining portion of the box, with the complete lid for the box being made detachable and placed when required opposite to the fixed portion of the box to complete it, the said box being fixed directly to the car while a plank adapted to serve as a seat is provided and attached to the second frame, by means of collapsible supports, so that when required the plank can be raised to form a seat, but when it is required it can be placed back in the frame. The detachable portion of the box is provided at the bottom with two sliders which can slide in two channels provided at the bottom of the seat plank, so that when the box is not used and the seat is to be covered by a roof, the detachable portion of the box with the lid is attached to the seat, to provide a back rest as well as a shade on the top. The frame should preferably be made of strong angle iron, so that it can hold sufficient weight.

According to another embodiment of my invention, the second frame is provided with a metallic sheet throughout and the sides are raised, the collapsible seat being provided on this sheet, the object of this arrangement being that the sheet with its raised sides and fitted in the second frame should act as the other half portion of the box, when this frame which is hinged to the first frame is raised, thus eliminating the use of the detachable half portion of the box.

According to another embodiment of my invention, the box is altogether eliminated and in that case only one frame is fixed to the car body and only the collapsible seat and luggage carrier are provided on it.

The invention will now be more fully described with reference to the accompanying drawings which illustrate the constructional features of a few embodiments of my invention which are generally stated above.

It may however be mentioned that various other modifications can be made in the constructional features of this device, without in any way departing from the spirit of the invention.

Fig. 1 shows the plan of one arrangement fitted to the back of the car with the seat opened out and the complete box.

Fig. 2 shows the sectional elevation at ZZ in Fig. 1.

Fig. 3 shows the section at XY in Fig. 2.

Fig. 4 shows the side elevation of the arrangement shown in Fig. 1 with the seat opened out, and half portion of a box placed behind the seat and serving as a protection from rain.

Fig. 5 shows the side elevation with the seat folded and the box closed and it also shows in dotted lines the second frame folded behind the box.

Figure 6:
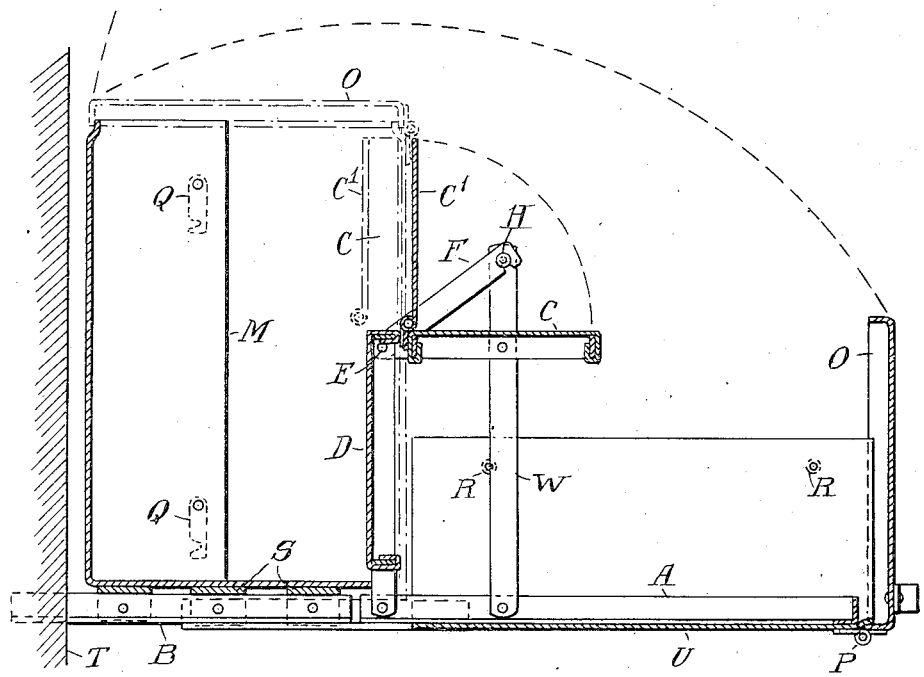
Fig. 6 shows the cross sectional elevation of a modified arrangement in which strong wooden or metallic sheet is provided in the frame and the sides raised, the said sheet with raised sides acting as half portion of the box.

Referring to the drawings, T shows the back of the car, B the angle iron frame which can be fixed to the car body by bolts. A shows the second angle iron frame hinged to the first frame. The angle iron frames A and B have metallic sheets placed on the horizontal projections inside the frame. M shows, in this case, the half portion of the box fixed to the frame B at the side nearest the car body. The top of this half portion of the box is open. N shows the other half of the box with lid O to cover the whole box, the said lid being hinged at P. Q shows a hook shaped piece hinged on box portion M, and R shows a pin fixed on the box portion N, in order to join the two box portions M and N. To the bottom of the lower side of the detachable portion N of the box two sliders L, L are fixed.

C and D represent in this case two planks made of sheet metal to form a seat and support for it, as will be seen from Fig. 2. C and D are hinged at E and when they are opened out, they lie flush with the angle iron frame A. F shows a flat iron piece pivoted at E and having a hook shaped end as shown, which fits over a lug H fixed on a flat metal piece W, and supports it in vertical position. S is pivoted at the bottom to the angle iron frame and it is also pivotally attached near its top end to the seat C. It may however be mentioned that it is not necessary to use the plank D and in place of it, two strong flat iron pieces can be used. When the plank C is raised it raises the plank D which stands vertical as shown in Fig. 2 and the hook shaped strip F is turned over the lug H of the strip W. Thus C can be used as a seat. If the box is also to be used then the person sitting on the seat C will have the box at his back. The space on the frame below and opposite to the plank C can be used for placing the luggage. When the box is not used the detachable portion N can be taken out and fixed at the end of the seat by means of the bottom of N which slides in the channels K provided at the bottom of the seat C. This view is represented in Fig. 4. The lid O will give protection from sun and rain. The space of the planks fixed in the frames can be used as a luggage carrier. U in Fig. 1 shows the sheet metal placed in the angle iron frame A, while S, S show the strips fixed in the frame B.

When the arrangement is to be used as a box and a luggage carrier the box is closed as shown in Fig. 5 and the seat is placed back in the frame, so that the space formed can be used as a luggage carrier. If a separate luggage carrier is not required, then the whole frame A can be raised against the back of the box as shown in Fig. 5 by dotted lines and attached by hooks to it.

Referring to Fig. 6 which shows a modified arrangement, the frame is covered with a metallic sheet and has raised sides. The collapsible seat is provided in the same manner as described above. The object of this arrangement is that when the frame A is raised and brought against the half portion of the box, the box is closed.

This eliminates the half detachable portion N of the box as illustrated in Fig. 4, the raised sides and end of A constituting the equivalent of N. A plank C' is hinged to the seating plank of the collapsible seat, so that when the seat is opened the hinged plank C' can serve as a back rest. Since the plank is hinged to the seating plank C, it is turned over the seat, so that it lies flush with it, when not in use. In this case when the whole frame A is turned to bring it opposite to the half portion M of the box, the collapsible seat remains inside the box.

Figure 7:
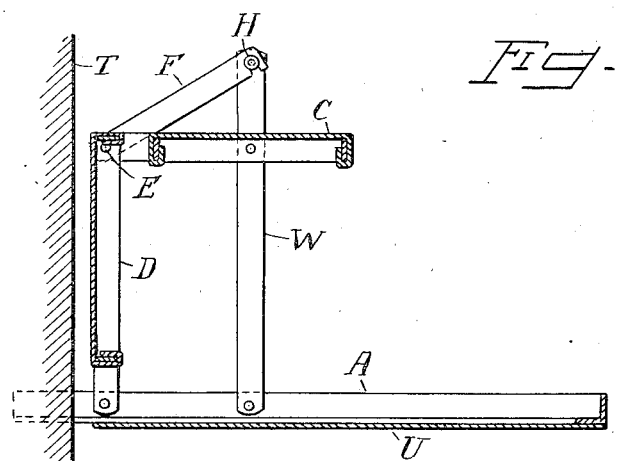
Fig. 7 shows the cross sectional elevation of the arrangement where no provision is made for the box.

In the exemplification of Fig. 7 which shows the combined unit without a box, the collapsible seat as illustrated in Fig. 4 is provided on the frame A, the frame A being directly fixed to the car. This will serve as a luggage carrier and seat or only a luggage carrier. The person sitting on the seat will then turn his back to the back of the car.

This is a very simple embodiment of my arrangement, but there is no provision of box in it.

It is now clear from the foregoing description that the combined unit will serve all the aforementioned purposes.

I claim:

A combined unit for attachment to the back of a car body comprising, a first frame fixed to the car body, a second frame hinged to the first frame adapted to be removed from a horizontal to an upright position, a box carried by the first frame and having a removable section forming a part thereof, latch members on said removable section and said second section to retain said second frame in upright position, a seat comprising a leg and a seat portion on the latter of which the removable box section may be mounted as a protection for the passengers, a hinged connection between one end of said leg portion and the seat portion, a hinged connection between the other end of the leg portion and the second frame, and means for maintaining the leg portion at right angles to the second frame and the seat portion at right angles to the leg portion.

RAM SWARUP SHAHU.